US012109535B2

(12) United States Patent
Sibener et al.

(10) Patent No.: US 12,109,535 B2
(45) Date of Patent: Oct. 8, 2024

(54) ENRICHMENT AND SEPARATION OF ISOTOPES, ISOTOPOLOGUES, OR OTHER CHEMICAL SPECIES, VIA DIFFERENTIAL EMBEDDING IN A CAPTURE MATRIX

(71) Applicant: The University of Chicago, Chicago, IL (US)

(72) Inventors: Steven J. Sibener, Chicago, IL (US); Kevin D. Gibson, Blue Island, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 549 days.

(21) Appl. No.: 17/453,357

(22) Filed: Nov. 3, 2021

(65) Prior Publication Data

US 2022/0143551 A1    May 12, 2022

Related U.S. Application Data

(60) Provisional application No. 63/110,681, filed on Nov. 6, 2020.

(51) Int. Cl.
*B01D 59/26* (2006.01)
*B01D 59/18* (2006.01)
*B01D 59/34* (2006.01)
*G21K 1/06* (2006.01)

(52) U.S. Cl.
CPC ............. *B01D 59/26* (2013.01); *B01D 59/18* (2013.01); *B01D 59/34* (2013.01); *G21K 1/06* (2013.01)

(58) Field of Classification Search
CPC ......... B01D 59/00–50; G21K 1/00–16; G21K 2201/065; G21K 2201/067; G21K 2201/068
See application file for complete search history.

(56) References Cited

U.S. PATENT DOCUMENTS

2020/0139302 A1    5/2020 Sibener et al.

FOREIGN PATENT DOCUMENTS

WO    WO 2018/213549 A1    11/2018
WO    WO-2019032223 A2 *  2/2019

OTHER PUBLICATIONS

J. Chem. Phys. 141, 18C514 (2014) (Year: 2014).*
J. Chem. Phys. 137, 074701 (2012) (Year: 2012).*
Thompson, R. S .; Brann, M. R .; Sibener, S. J. Sticking Probability of High-Energy Methane on Crystalline, Amorphous, and Porous Amorphous Ice Films. *J. Phys. Chem. C* 2019, 123, 17855-17863.

(Continued)

*Primary Examiner* — Nicholas A Smith
*Assistant Examiner* — John Lee
(74) *Attorney, Agent, or Firm* — Bell & Manning, LLC

(57) ABSTRACT

Methods for enriching, separating, or enriching and separating isotopes and isotopologues, as well as other chemical species, contained in a supersonic beam are provided. In the methods, a supersonic beam having different isotopes, isotopologues, or other chemical species entrained therein and a beam comprising a matrix material converge on a surface. As the matrix material forms a solid matrix on the surface, heavier isotopes, isotopologues, and/or other chemical species become preferentially embedded in the matrix, while lighter isotopes, isotopologues, and/or other chemical species are preferentially scattered from the surface.

17 Claims, 6 Drawing Sheets

(56) References Cited

OTHER PUBLICATIONS

Gibson, K. D.; Killelea, D. R.; Yuan, H.; Becker, J. S.; Sibener, S. J. Determination of the Sticking Coefficient and Scattering Dynamics of Water on Ice Using Molecular Beam Techniques. *J. Chem. Phys.* 2011, 134, 034703\1-7.

K. D. Gibson et al., "Molecular interactions with ice: Molecular embedding, adsorption, detection, and release," *The Journal of Chemical Physics* (2014), vol. 141, 18C514; pp. 1-12. Doi: 10.1063/1.4895970.

Grant G. Langlois et al., "Capture of Hyperthermal CO2 by Amorphous Water Ice via Molecular Embedding," *The Journal of Physical Chemistry A* 2015, vol. 119; pp. 12238-12244.

K. D. Gibson et al., Scattering of High-Incident-Energy Kr and Xe from Ice: Evidence that a Major Channel Involves Penetration into the Bulk, *The Journal of Physical Chemistry A* (2012), vol. 116; pp. 14264-14273.

K. D. Gibson et al., "Energetic ballistic deposition of volatile gases into ice," *Chemical Physics Letters* (2012), vol. 531; pp. 18-21.

S. Pratihr et al., "Chemical Dynamics Simulations of High Energy Xenon Atom Collisions with the {0001} Surface of Hexagonal Ice," *The Journal of Physical Chemistry C* (2013), vol. 117; pp. 2183-2193.

Thomas R. Mazur et al., "Demonstration of magnetically activated and guided isotope separation," *Nature Physics*, Published online: Jun. 29, 2014; pp. 1-5. DOI:10.1038/NPHYS3013.

\* cited by examiner

ENRICHMENT AND SEPARATION OF ISOTOPES, ISOTOPOLOGUES, OR OTHER CHEMICAL SPECIES, VIA DIFFERENTIAL EMBEDDING IN A CAPTURE MATRIX

CROSS-REFERENCE TO RELATED APPLICATIONS

The present application claims priority to U.S. provisional patent application No. 63/110,681 that was filed Nov. 6, 2020, the entire contents of which are incorporated herein by reference.

REFERENCE TO GOVERNMENT RIGHTS

This invention was made with government support under Grant No. FA9550-19-1-0324 awarded by the Air Force Office of Scientific Research. The government has certain rights in the invention.

BACKGROUND

Proposals for separating and enriching isotopes came about almost immediately after isotopes were discovered. In 1919, Lindemann and Aston examined a vast array of possible methods including fractional distillation, chemical separation, gaseous diffusion, gravitational and centrifugal separation, along with separation of positive ions with electric and magnetic fields. Their early analysis concluded that isotopes "must be separable in principle though possibly not in practice." One of the first industrial processes was the electrolytic production of $D_2O$, of interest as a moderator for a nuclear pile. (M. Benedict et al., *Nuclear Chemical Engineering*, McGraw-Hill, New York, 1957.) At the same time, the Manhattan Project was developing methods for enriching $^{235}U$ from a mainly $^{238}U$ feedstock by a combination of electromagnetic methods and gaseous diffusion. (A. L. Yergey et al., *J. Am. Soc. Mass Spectrom.*, 1997, 8, 943-953; and L. O. Love, *Science*, 1973, 182, 343-352.) Centrifugation of $UF_6$ was also explored, but not employed at the time. (B. C. Reed, *Phys. Perspect.*, 2009, 11, 426-441.) In practice, fractional distillation, gaseous diffusion and magnetic sector mass spectrometers (Calutrons) were all used on an industrial scale to enrich $^{235}U$. (Yergey et al., 1997; and Love, 1973.) Gaseous diffusion, distillation and gas centrifuges exhibit small isotopic separation effects that are overcome through large-scale installations where many separation stages are performed in sequence. Alternatively, a variety of laser-based techniques exist that are capable of separating isotopes to a much higher degree, but require ionization or excitation of the target isotope; illustrative examples include atomic vapor laser isotope separation (AVLIS) and techniques such as magnetically activated and guided isotope separation (MAGIS). (G. N. Makarov, *Phys.-Uspekhi*, 2015, 58, 670-700; T. R. Mazur et al., *Nat. Phys.*, 2014, 10, 601-605; and P. A. Bokhan, et al., *Laser Isotope Separation in Atomic Vapor*, John Wiley & Sons, 2006.) Another recent method was demonstrated in the Sibener labs based upon the spatial and temporal separation of isotopes using gas-surface atomic diffraction. (Mazur et al., 2014.)

Today, isotope separation and enrichment underpin advanced technologies in a wide variety of fields, including isotopic labeling in the life sciences, the use of radioisotopes in medicine, and a variety of energy systems. Microelectronics may also begin to utilize isotopic enrichment as highly enriched $^{28}Si$ wafers have markedly increased thermal conductivity and electron transport characteristics over natural abundance silicon wafers. (T. Ruf et al., *Solid State Commun.*, 2000, 115, 243-247; and J.-Y. Li et al., *Appl. Phys. Lett.*, 2013, 103, 162105/1-4.) Moreover, isotopically-purified materials such as $^{28}Si$ and $^{12}C$ are growing interest due to their potential applicability to quantum information science computing platforms. (K. M. Itoh et al., *Mrs Commun.*, 2014, 4, 143-157; and B. E. Kane, *Nature*, 1998, 393, 133-137.)

SUMMARY

Methods for enriching, separating, or enriching and separating isotopes, isotopologues, as well as other chemical species entrained in a supersonic beam are provided.

One example of a method for enriching, separating, or enriching and separating isotopes, isotopologues, or isotopes and isotopologues includes the steps of: (a) directing a first beam onto a surface, the first beam comprising a matrix material that forms a solid matrix on the surface; (b) directing a second beam onto the surface, such that the first and second beams converge at the surface, wherein the second beam is a supersonic beam comprising a first chemical species and a second chemical species, the first chemical species having a higher incident momentum than the second chemical species, whereby the first chemical species is preferentially embedded in the solid matrix, relative to the second chemical species; and (c) releasing and collecting the first chemical species that is embedded in the solid matrix, collecting the second chemical species that scatters from the surface, or both. The first beam may be a supersonic beam or an effusive beam.

In some embodiments of the methods, the first and second chemical species are isotopes of the same element or isotopologues of the same molecule. In some embodiments of the methods, the solid matrix is an amorphous matrix, such as amorphous ice.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1, lower panel, shows a top view of the instrument, in which the matrix beam can be seen. The matrix beam could also be located in a separate differentially-pumped beam manifold.

FIG. 3, lower panel, shows relative TPD intensities, normalized by the incident beam intensities, as a function of momentum for $^{129}Xe$.

DETAILED DESCRIPTION

Figure 1:
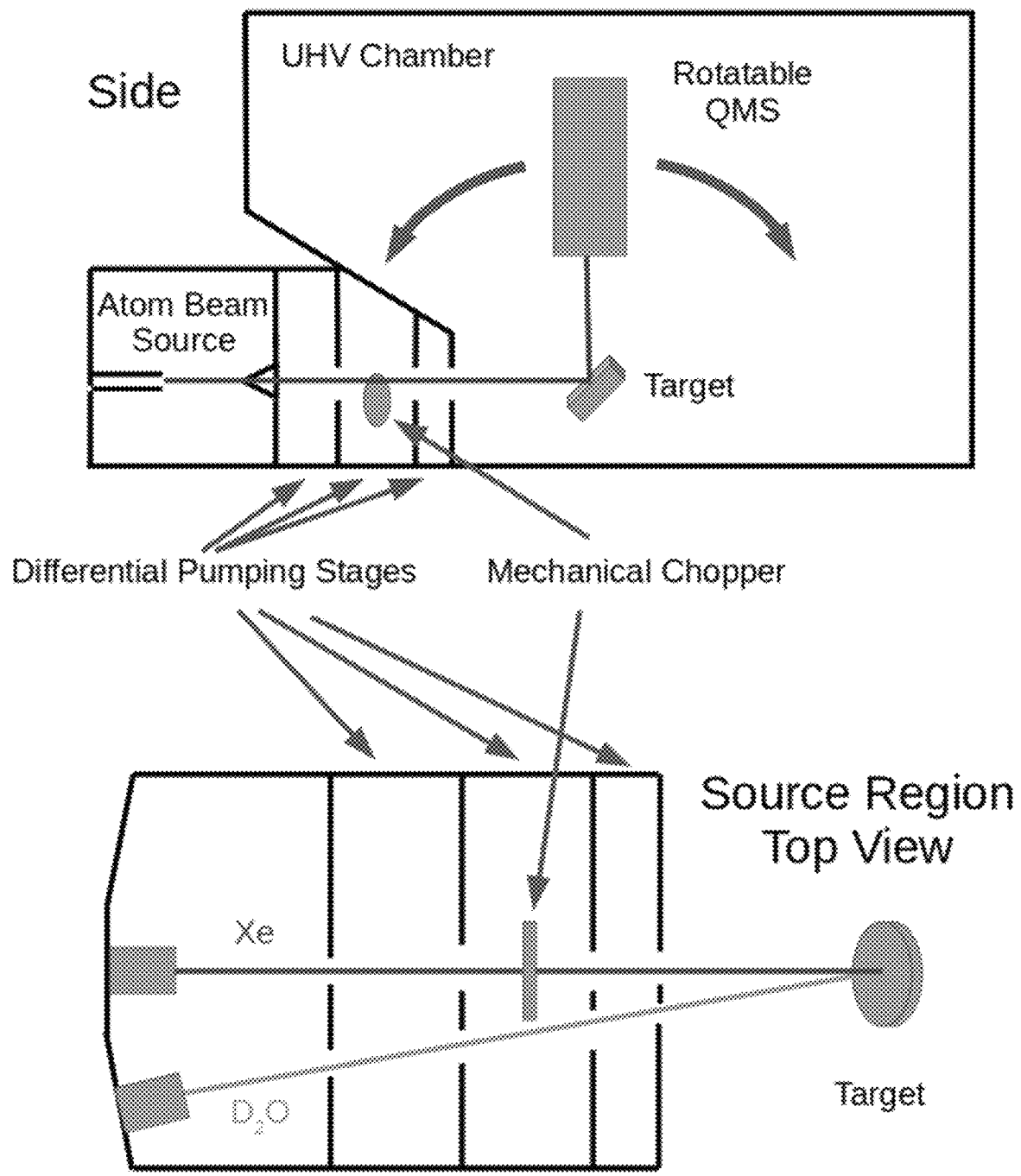
FIG. 1, upper panel, shows a schematic diagram of a side view of the multiple supersonic beam instrument.

Provided are methods for enriching, separating, or enriching and separating isotopes, isotopologues, or both, as well as enriching, separating, or enriching and separating other chemical species. In the methods, a supersonic beam having different isotopes, different isotopologues, a mixture of isotopes and isotopologues, and/or other chemical species entrained therein (a "chemical species beam") converges at a surface with a beam comprising a matrix material (a "matrix beam"). As the matrix material forms a solid matrix on the surface, heavier isotopes, isotopologues, and/or heavier other chemical species become preferentially embedded in the matrix, while lighter isotopes, isotopologues, and/or lighter other chemical species are preferentially scattered from the matrix. As used herein, the term "preferentially embedded" means that the heavier isotope, isotopologue, or other chemical species is embedded in the matrix to a greater degree than the lighter isotope, isotopologue, or other chemical species. Similarly, the term "preferentially scattered" means that the lighter isotope, isotopologue, or other chemical species is scattered from the matrix to a greater degree than the heavier isotope, isotopologue, or other chemical species. As a result, the fraction of embedded isotopes, isotopologues, and/or other chemical species is enriched with heavier isotopes, isotopologues, and/or other chemical species, and the fraction of scattered isotopes, isotopologues, and/or other chemical species is enriched with lighter isotopes, isotopologues, and/or other chemical species.

Isotopes, isotopologues, as well as other chemical species that can be enriched, separated, or enriched and separated using the methods include different atoms, isotopes of the same atom, different types of molecules, and isotopes of the same molecule. The methods can also be used to separate atoms from molecules, based on differences in their mass. The isotopes of an element are forms of the same element that contain equal numbers of protons but different numbers of neutrons. Similarly, the isotopologues of a molecule are forms of the same molecule that have the same chemical structure, but differ in their isotopic composition by virtue of at least one atom in the isotopologues having a different number of neutrons. The isotopes, isotopologues, as well as other chemical species that are enriched, separated, or enriched and separated need not be of the same type. For example, the methods can be used to separate atoms from molecules.

Applications for the enrichment and separation methods span a wide variety of technologies in the physical and biological sciences, medicine, advanced energy and energetic systems. When used to enrich, separate, or enrich and separate isotopes or isotopologues, the methods can be used in the production of isotopically-purified materials that exhibit high-performance electronic and thermal characteristics, as well as isotopically purified spin-free materials for use in quantum information science platforms.

The methods exploit the energy and momentum barriers that need to be overcome in order to embed a given isotope, isotopologue, or other chemical species into a capture matrix. The supersonic atomic or molecular beams have controlled velocities and narrow velocity distributions, such that the entrained isotopes, isotopologues, as well as other chemical species have identical velocities arising from seeded beam expansion. As a result, different isotopes, isotopologues, as well as other chemical species have different incident momenta and translational kinetic energies, with the heavier species having higher incident momenta.

The isotope, isotopologue, as well as other chemical species enrichments and/or separations can be carried out in a vacuum chamber equipped with two supersonic beam sources (a "beam chamber"). The supersonic beams containing the isotopes, isotopologues, other chemical species, or a combination thereof to be enriched, separated, or enriched and separated may be generated by an atomic or molecular beam source configured to supersonically expand a gas through a variable temperature nozzle, wherein the gas includes at least two isotopes, isotopologues, and/or other chemical species. In some embodiments of the methods, the gas includes more than two isotopes and/or more than two isotopologues and/or more than two other chemical species. If a supersonic beam contains three or more isotopes, isotopologues, and/or other chemical species, the methods can be used to enrich or deplete one or more of the isotopes, isotopologues, and/or other chemical species relative to one or more of the other isotopes, isotopologues, and/or other chemical species.

Heating the nozzle, seeding isotopes, isotopologues, as well as other chemical species in a low molecular weight carrier gas (such as helium or hydrogen), or doing both will increase the kinetic energy of the supersonic beam. If one wants to tune the velocity precisely, then a variable temperature nozzle may be used to heat or cool a given seed gas/carrier gas combination. The expansion is isenthalpic, so the overall kinetic energy is predictable in the gas mixture. For example, pure helium has a kinetic energy that is predicted by thermodynamics. Mixing in a low percentage of the isotopes, isotopologues, other chemical species, or a combination thereof to be enriched with the helium results in a beam with a velocity close to that of pure helium. More precisely, one can calculate, ideally, velocity using a weighted average of the heat capacity of the carrier gas plus that of the seed gas. Some velocity difference between the light carrier gas and the heavier seed gas may occur for real, as opposed to ideal, gas expansions. Therefore, it may be preferable to tune the energy of the beam by nozzle temperature for a given composition rather than by composition. This allows one to broadly tune the incident kinetic energy.

The supersonic beams may be continuous, pulsed, or modulated, for example, via mechanical chopping. The supersonic expansion may be a free expansion or may be passed through an aperture, such as a skimmer or collimator, before it strikes the surface. This skimming effect will cause a slight enrichment of the heavier isotopes or isotopologues present in the beam before the beam strikes the surface, as the heavier isotopes or isotopologues are preferentially concentrated toward the centerline of the supersonic beam during the expansion. This skimming effect, which may influence the composition of the incident beam under favorable expansion conditions, can therefore be used advantageously to further increase the desired enrichment.

The beam containing the matrix material may be a supersonic beam, but other types of beams, such as effusive beams can be used. An effusive beam can be generated using a thermal effusive source, such as a heated molecular beam doser.

A temperature controller is used to modulate the temperature of the substrate upon which the capture matrix is formed and the temperature of the capture matrix itself. As such, the substrate can be maintained at a temperature at which the matrix material condenses into a solid matrix and does not sublime and then heated to a temperature at which chemical species embedded within the matrix are released. By way of illustration, for an ice matrix a temperature of 130 K or lower would be sufficient for solid matrix formation. The materials from which the substrate is made are not particularly limited. By way of illustration, metals and other materials with good thermal conductivities can be used.

As the matrix beam impinges on the surface, a solid capture matrix is formed and isotopes, isotopologues, and/or other chemical species from the supersonic beam become embedded within the growing matrix or scatter from it. Because heavier, higher momenta isotopes, isotopologues, or other chemical species will have a higher probability of embedding, the embedded fraction will be enriched in the heavier isotopes, isotopologues, and/or other chemical species and depleted in the lighter isotopes, isotopologues, and/or other chemical species, relative to their concentrations in the incident supersonic beam. In addition, because the chemical species beam and the matrix beam are run concurrently, a fresh capture matrix surface is continuously exposed to the incident chemical species beam. The incident supersonic beam conditions, including translational kinetic energies and incident angles, as well as surface and matrix temperatures, can be adjusted to optimize the differential embedding of heavier isotopes, isotopologues, as well as other chemical species. By way of illustration only, the incident momenta of the isotopes, isotopologues, as well as other chemical species in the supersonic beam may be in the range from about $200 \times 10^{-24}$ kg m s$^{-1}$ to about $800 \times 10^{-24}$ kg m s$^{-1}$.

Once the desired degree of separation has been achieved, a fraction enriched in heavy isotopes, heavy isotopologues, other heavy chemical species, or a combination thereof can be released from the capture matrix and collected. Similarly, a fraction enriched in light isotopes, light isotopologues, other light chemical species, or a combination thereof scattered from the capture matrix can be collected, depending on interest in either the heavier or lighter isotopes, isotopologues, and/or other chemical species. Straightforward release and collection techniques can be used. By way of illustration, the scattered gas, including scattered isotopes, isotopologues, other chemical species, or a combination thereof can pass through an aperture which leads to a separate vacuum chamber that is pumped by a high vacuum pump, whereby the exhaust of the high vacuum pump will contain the reflected portion enriched in the lighter isotopes, isotopologues, other chemical species, or combination thereof. The embedded fraction can be collected by periodically warming the capture matrix to a temperature at which entrapped isotopes, isotopologues, as well as other chemical species escape from the matrix. For example, the capture matrix can be heated to or above a temperature at which an amorphous capture matrix undergoes an amorphous to crystalline phase transition. As embedded isotopes, isotopologues, and/or other chemical species are released, they enter the gas phase. The exhaust of the beam chamber's high vacuum pump will be enriched in the heavier isotopes, isotopologues, and/or other chemical species, which can then be separated from the exhaust. The isotopes, isotopologues, as well as other chemical species collected from matrix and/or the scattered fraction can separately be recompressed with a mechanical compressor.

The methods are able to provide excellent enrichment, separation, or both using a single pass. However, cycling of the collected fractions through multiple passes of the separation method can lead to significantly higher levels of separation.

The methods are general in applicability and can be used to enrich and/or separate atoms, isotopes, molecules, and/or isotopologues across a wide range of masses. Because these methods are able to enrich, separate, or enrich and separate isotopes and isotopologues, as well as other chemical species based on minor differences in their incident momenta due to mass differences, effectively any isotopes, isotopologues, and chemical species that can be co-expanded in a supersonic beam can be enriched, separated, or enriched and separated by the methods.

Illustrative examples of isotopes that can be enriched, separated, or enriched and separated by these methods include but are not limited to $^{36}$Ar and $^{40}$Ar; $^{6}$Li and $^{7}$Li; $^{22}$Ne and $^{20}$Ne; $^{24}$Mg and $^{26}$Mg; $^{124}$Xe, $^{129}$Xe, $^{131}$Xe, $^{132}$Xe, and $^{134}$Xe; and $^{78}$Kr, $^{82}$Kr, and $^{86}$Kr. Illustrative examples of isotopologues that can be enriched, separated, or enriched and separated by these methods include but are not limited to $^{12}$CH$_4$ and $^{13}$CH$_4$; $^{28}$SiH$_4$ and $^{29}$SiH$_4$; $^{28}$SiF$_4$ and $^{29}$SiF$_4$; H$_2$, HD, HT, D$_2$, DT, and T$_2$; $^{1}$H$_2$$^{16}$O, $^{1}$H$^{2}$H$^{16}$O, $^{2}$H$_2$$^{16}$O, $^{1}$H$_2$$^{16}$O, and $^{1}$H$_2$$^{18}$O, $^{16}$O$_2$ and $^{18}$O$_2$; $^{14}$N$_2$ and $^{15}$N$_2$; HBr and DBr; HCl and DCl; HI and DI; H$_2$S and D$_2$S; CH$_3$F, CD$_3$F, $^{13}$CH$_3$F, and $^{13}$CD$_3$F; CH$_3$Cl, CD$_3$Cl, $^{13}$CH$_3$Cl, and $^{13}$CD$_3$Cl; $^{13}$C$^{16}$O$_2$, $^{12}$C$^{16}$O$_2$, $^{13}$C$^{18}$O$_2$, and $^{12}$C$^{18}$O$_2$; $^{12}$C$^{18}$O, $^{13}$C$^{18}$O, $^{13}$C$^{16}$O, and $^{13}$C$^{18}$O; NH$_3$, $^{15}$NH$_3$, ND$_3$, and $^{15}$ND$_3$; NO and $^{15}$NO; $^{14}$N$_2$O, $^{15}$N$^{14}$NO, and $^{15}$N$_2$O; PH$_3$ and PD$_3$; COS and $^{13}$COS; CHCl$_2$F and CDCl$_2$F; $^{12}$CH$_2$F$_2$, $^{13}$CH$_2$F$_2$, $^{12}$CD$_2$F$_2$, and $^{13}$CD$_2$F$_2$; CH$_3$Br, $^{13}$CH$_3$Br, and CD$_3$Br; $^{12}$CH$_3$N, $^{13}$CH$_3$N, $^{13}$CH$_3$$^{15}$N, $^{12}$CH$_3$$^{15}$N, $^{12}$CD$_3$N, and $^{12}$CH$_2$DN; $^{12}$C$_2$H$_4$, $^{12}$C$_2$H$_2$D$_2$, $^{13}$C$_2$H$_4$, $^{13}$C$_2$D$_4$, and $^{12}$C$_2$H$_3$D; $^{12}$C$_2$H$_6$, $^{13}$C$_2$H$_6$, and $^{12}$C$_2$D$_6$; $^{32}$SF$_4$, $^{33}$SF$_4$, $^{34}$SF$_4$, and $^{36}$SF$_4$; and isopropane isotopologues, including $^{12}$C$_3$H$_6$, $^{12}$C$_3$D$_6$, $^{13}$C$_3$H$_6$, and $^{12}$C$_3$H$_4$D$_2$.

One example of an apparatus that can be used to carry out the separation methods is shown in FIG. 1. The apparatus includes: a vacuum chamber (i.e., a beam chamber; e.g., a high vacuum or ultra-high vacuum (UHV) chamber); a substrate (referred to as a target in the figure) having a surface housed within the vacuum chamber; a beam source (in this example—an atomic beam source) configured to direct a supersonic chemical species beam onto a surface of the substrate; a separate beam source configured to direct a matrix beam onto the surface of the substrate (see, FIG. 1, lower panel), such that the chemical species beam and the matrix beam overlap at the surface; a temperature control device in thermal communication with the substrate; and a collector configured to collect isotopes, isotopologues, and/or other chemical species released from a capture matrix on the surface of the substrate or scattered from a capture matrix on the surface of the substrate. In the apparatus shown in FIG. 1, atoms or molecules scattered from the substrate surface are detected with a quadrupole mass spectrometer (QMS) which can be rotated with respect to the surface normal of the substrate surface. One or more pumps in fluid communication with the vacuum chamber can be used to maintain a low pressure within the vacuum chamber, and one or more pumping stages may be provided between the vacuum chamber and the beam sources.

EXAMPLE

This example illustrates the capture of $^{134}$Xe and $^{136}$Xe in an amorphous ice matrix, relative to the reference isotope, $^{129}$Xe. Enrichment of the heavier isotopes in the capture matrix was 1.2 for $^{134}$Xe and 1.3 for $^{136}$Xe, greater than that expected for natural abundance.

Using supersonic molecular beam techniques, Xe atomic beams were generated with controlled velocities, with relatively narrow velocity distributions due to supersonic expansion, and with all of the entrained isotopes having identical velocities arising from the seeded molecular beam expansion. (D R. Miller, in *Atomic and Molecular Beam Methods*, ed. G. Scoles, Oxford University Press, New York-Oxford, 1988, Vol. 1, 14-53; and H. Pauly, in *Atomic and Molecular beam Methods*, ed. G. Scoles, Oxford University Press, New York-Oxford, 1988, Vol. 1, 124-152.) Consequently, the heavier isotopes entrained in the high Mach number beam struck the surface with higher momenta. It was found that the heavier isotope became preferentially absorbed, i.e., embedded, in the ice matrix. Herein the efficacy of this method was demonstrated by comparing the capture of $^{134}$Xe and $^{136}$Xe to the reference isotope, $^{129}$Xe. Enrichment of the heavier isotope in the capture matrix was demonstrated in this example to be 1.2 for $^{134}$Xe and 1.3 for $^{136}$Xe, which was higher than expected as compared to natural abundance. Enriched isotopic fractions could be collected from either the condensate or the reflected fraction.

Experimental

These experiments were done using a multiple-molecular-beam gas-surface scattering instrument; a schematic diagram is shown in FIG. 1. Independent beams of Xe and D$_2$O were produced in the first region, passed through a skimmer, and then passed through several regions of differential pumping before entering the ultra-high-vacuum (UHV) chamber. They converged on a manipulator holding an unpolished, polycrystalline Ta plate that was rotatable so that the incident angle ($\Theta_I$) was variable. The Ta plate was resistively heated and cooled with liquid nitrogen or liquid helium. Atoms or molecules leaving the Ta surface were detected with a collimated (~1° FWHM) and doubly-differentially-pumped quadrupole mass spectrometer (QMS) which could be rotated around the manipulator so that the detection angle ($\Theta_F$) relative to the surface normal was variable. Ions for the QMS were created by an electron-bombardment ionizer. The mass passed by the QMS was determined by a computer-controlled 16 bit digital-to-analog converter (DAC).

The Xe beam's incident intensity and velocity were measured by lowering the sample plate and rotating the QMS so that its aperture was directly in line with the beam. The rotating mechanical chopper had small slots so that the beam velocity could be measured via time-of-flight techniques. For other experiments, the chopper had large slots so that when no longer spinning it could be positioned so that the beam was not blocked and a continuous exposure of the target surface was obtained.

Figure 2:
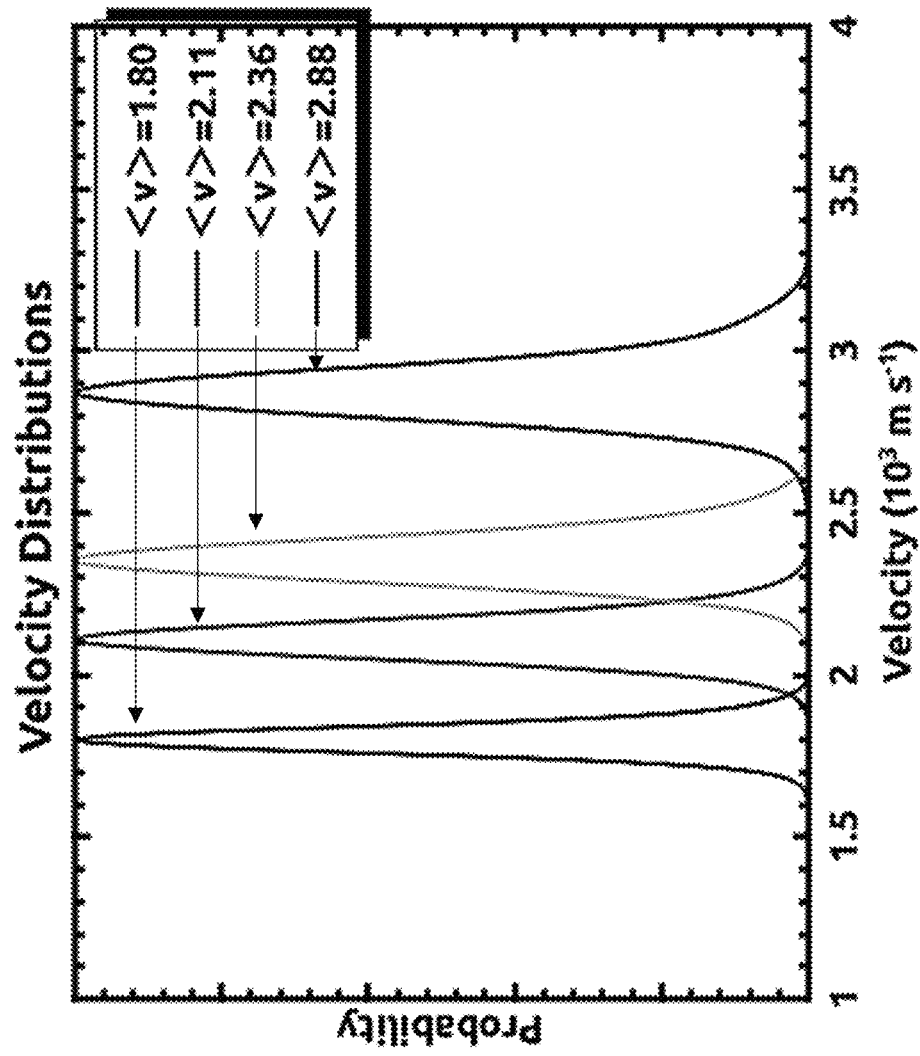
FIG. 2 shows representative velocity distributions of the incident supersonic Xe beam.

A D$_2$O beam was produced by bubbling He at an absolute pressure of 300 Torr through a room temperature reservoir containing the liquid and expanded through a 250 µm pinhole. D$_2$O was used since the mass 20 background in the detector was much lower than that of mass 18. The Xe beam was produced using a mixture of ~1% or less of Xe in H$_2$ expanded through a 15 or 20 µm pinhole at 200 psig. The nozzle holding the pinhole could be held at a temperature between 300 K and 625 K. This allowed for the production of Xe atoms with average velocities between 1.8×10$^3$ and 2.9×10$^3$ m s$^{-1}$. Some example velocity distributions are shown in FIG. 2. For the experiments described, the quantities of three isotopes were measured: 129, 134, and 136 with natural abundances of 26.4%, 10.44%, and 8.86%, respectively. (Atomic Weights and Isotopic Compositions for All Elements, https://physics.nist.gov/cgi-bin/Compositions/stand_alone.pl, (accessed Jan. 1, 2020).) For any given supersonic beam conditions, the velocity distributions were the same for these three isotopes.

Figure 3:
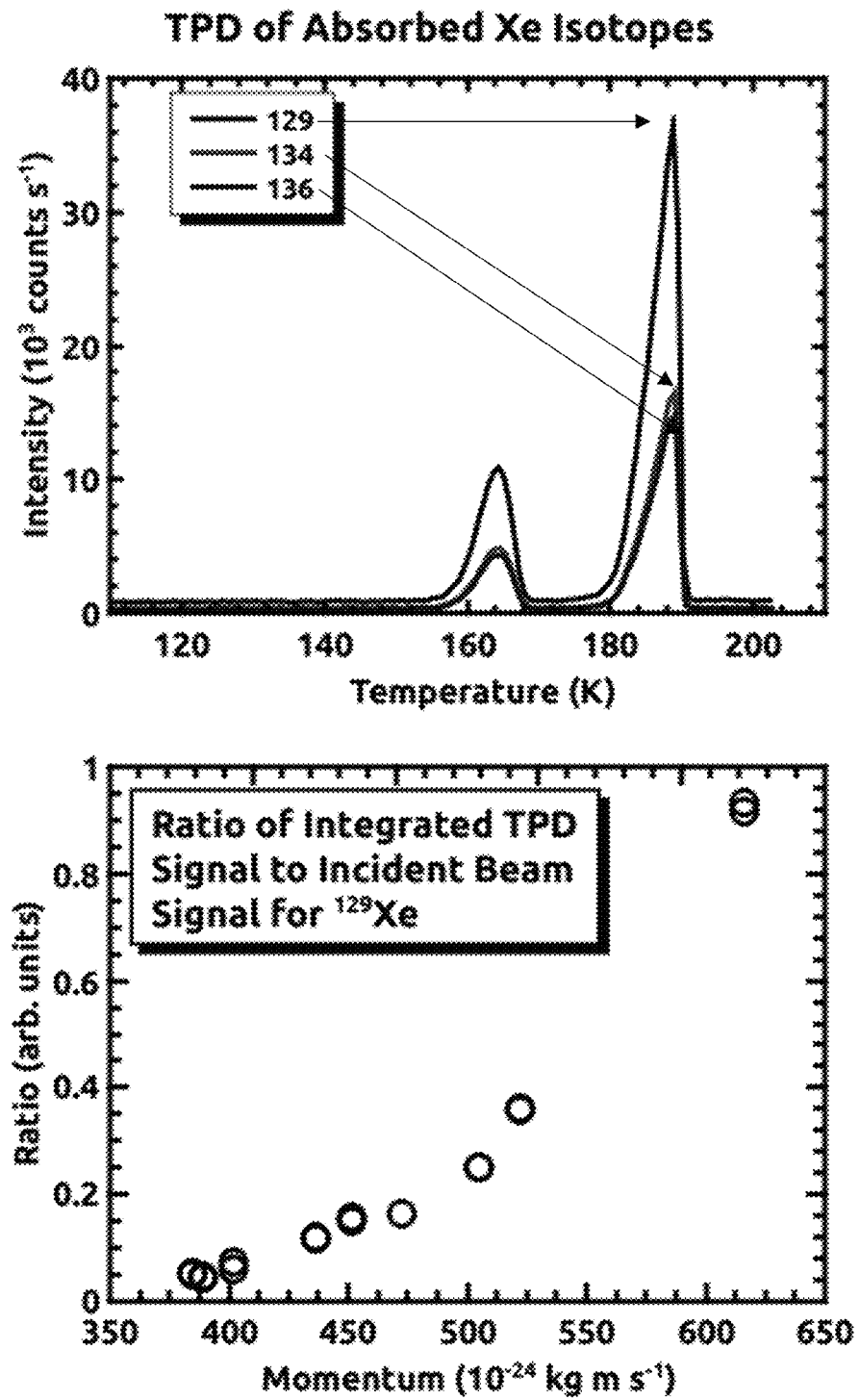
FIG. 3, upper panel, shows thermal desorption spectra for the three Xe isotopes taken after a 45-minute exposure of the surface to $D_2O$ and Xe ($<v>=2.88 \times 10^3$ m s$^{-1}$) at $\Theta_i=10°$, with a linear ramp rate of 10 K min$^{-1}$.

For all of the experiments, the temperature of the sample plate was held between 110 K and 125 K while being exposed to the D$_2$O and Xe. At these temperatures, the condensed D$_2$O formed non-porous amorphous solid water (ASW). (D. E. Brown et al., *J. Phys. Chem.*, 1996, 100, 4988-4995; K. P. Stevenson et al., *Science*, 1999, 283, 1505-1507; and G. A. Kimmel, et al., *J. Chem. Phys.*, 2001, 114, 5295-5303.) The D$_2$O and Xe beams were run concurrently so that a fresh D$_2$O surface was always being exposed to the incident seeded Xe beam. The procedure involved exposing the surface at $\Theta_I$=10° for 45 minutes. Then, the amount of embedded Xe was measured using temperature programmed desorption (TPD). The sample plate was heated at a linear rate of 10 K min$^{-1}$, while the desorbing D$_2$O signal and that of the three Xe isotopes were consecutively monitored at 1 second intervals. The D$_2$O signal was checked to ensure the ice growth rate was consistent between experiments. An example of the TPD spectra for the three Xe isotopes is shown in FIG. 3. The peak at ~160 K occurs at the ASW-crystalline ice transition. The larger peak occurs where the D$_2$O rate is greatest. The integrated intensity of each mass was used for determining the quantity of embedded Xe. FIG. 3 also shows the relative intensity of the $^{129}$Xe TPD spectra, normalized by the incident beam intensity, as a function of the incident momentum.

The zero-order D$_2$O TPD angular intensity distribution was very broad. To measure the relative intensities of the Xe in the incident beam, the sample plate was heated to 250 K, and a mass spectrum of scattered Xe was taken with $\Theta_I$=$\Theta_F$=45°. At this surface temperature, neither Xe nor background water sticks to the surface. The angular intensity distribution of Xe from the relatively rough sample surface also had a broad angular intensity distribution, and because of the low intensity it could be taken at the same ionizer emission current as the TPD spectra, which was not possible with the straight through beam. As a check on this method, the surface was cooled with liquid helium, which allowed for the adsorption of Xe directly from the beam for a sufficient time to build up a many atom thick overlayer, based on the Xe TPD intensities from previous experiments. (K. D. Gibson et al., *J. Phys. Chem. C*, 2012, 116, 14264-14273.) After a 45-minute exposure, the ensuing Xe TPD gave the same ratios as that of the scattering measurements for the beam conditions used. This confirmed that the relative amounts of Xe isotopic embedding were accurate.

Results and Discussion

Figure 4:
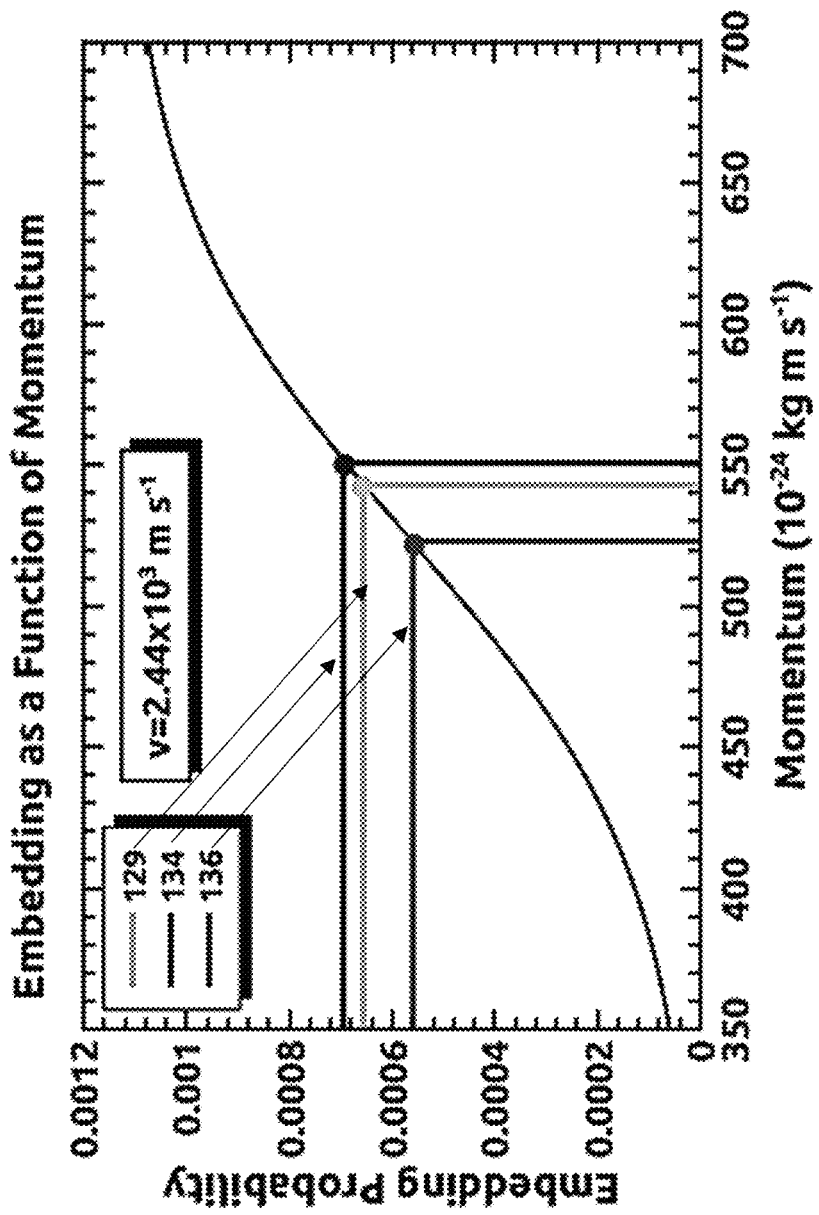
FIG. 4 shows a schematic example of predicted embedding probabilities for $^{136}Xe$, $^{134}Se$, and $^{129}Xe$ versus incident momentum for one incident beam condition where all isotopes are entrained into the supersonic flow with the same velocity. The heavier isotopes systematically embed with higher probabilities into the ice capture matrix.
Figure 5:
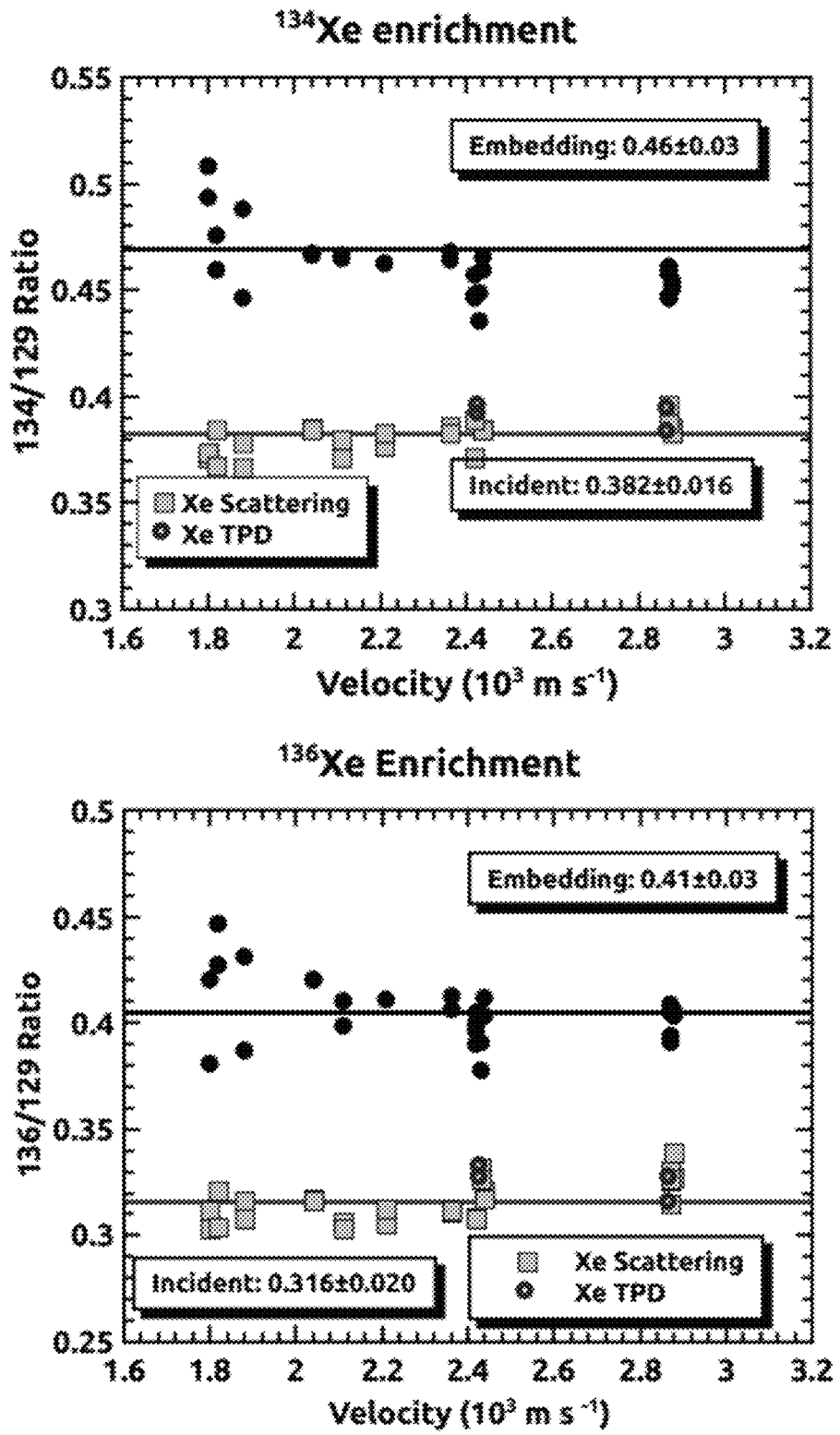
FIG. 5 shows the ratios of masses 134 (upper panel) and 136 (lower panel) to 129 versus the average velocities of the Xe beams used in the Example. The incident intensities are the relative values determined either from the Xe scattering off of a bare Ta sample surface, or from thermal desorption spectra of multilayer Xe grown on the Ta sample plate.

FIG. 4 demonstrates how the isotope separation was accomplished. The solid black line is the embedding probability versus incident momentum from Langlois et al. (Langlois et al., 2015.) For any given beam conditions, the velocities of the three isotopes were the same. The figure also shows the embedding probabilities for the three isotopes at an incident velocity of 2.44×10$^3$ m s$^{-1}$ and the predicted increase in embedding probability for the heavier isotopes. FIG. 5 summarizes the principal results of the separation experiments. No attempt was made to measure the absolute flux of the incident Xe, so all of the data are given as a ratio of $^{134}$Xe and $^{136}$Xe signals to that of $^{129}$Xe.

For the range of velocities explored, this ratio was higher than expected for equal embedding probabilities; 1.2 for $^{134}$Xe and 1.3 for $^{136}$Xe. This was calculated using the ratio of the average values of the signal from the heavier isotope to that of $^{129}$Xe determined from integrated TPD signals divided by the same ratio for the scattering measurements, which represent measured natural abundance.

Figure 6:
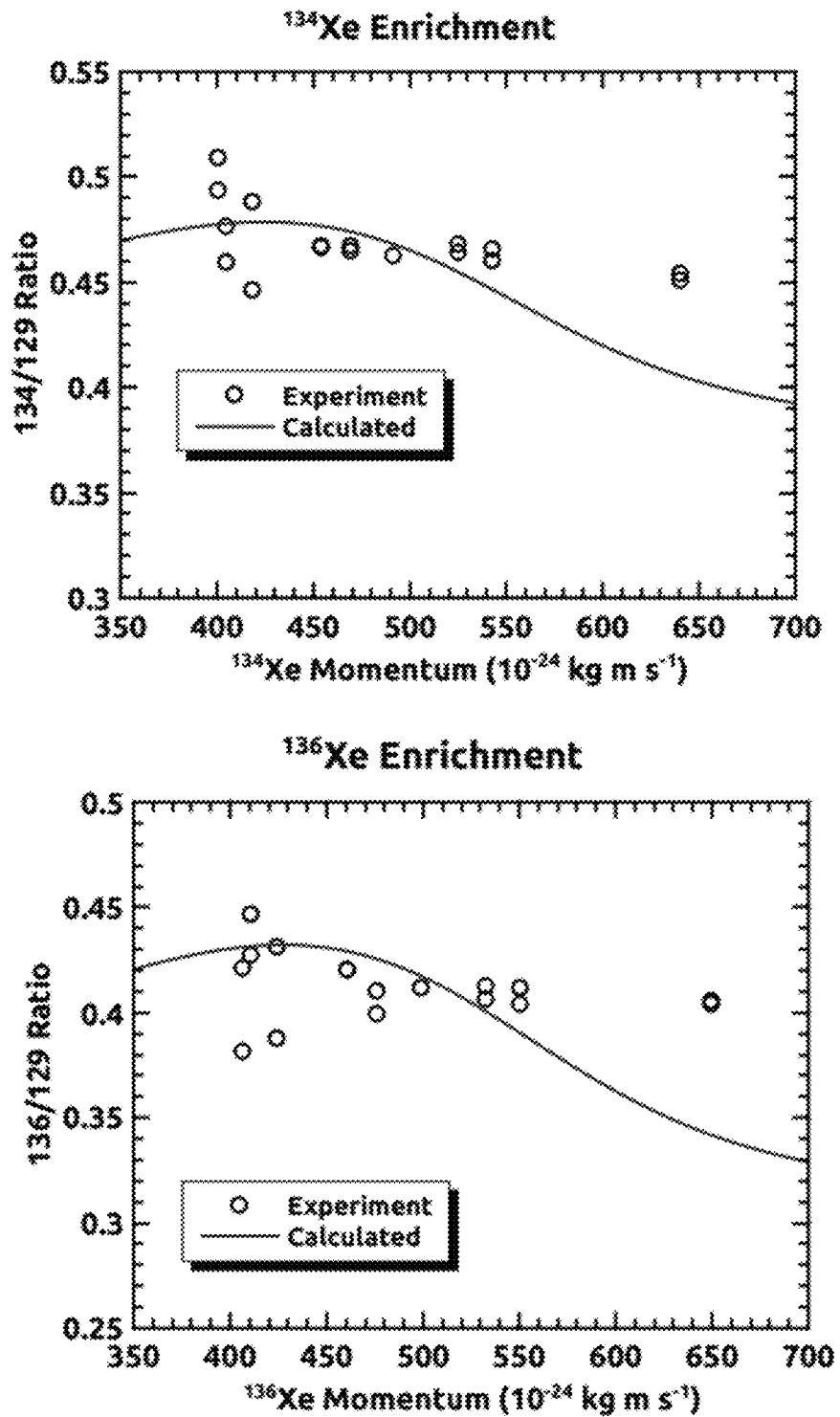
FIG. 6 shows comparisons of the experimentally measured mass ratios for 134 (upper panel) and 136 (lower panel) to 129 at different incident velocities plotted against the momentum of the heavier isotope and the mass ratios calculated from the results reported in G. G. Langlois et al., J. Phys. Chem. A, 2015, 119, 12238-12244.

The increase in embedding probability was approximately linear for most of the conditions used, so it is unsurprising that the degree of separation was approximately linear. FIG. 6 shows the comparison between the data presented in this paper and what was calculated from the prior universal curve for embedding in ASW. (Langlois et al., 2015.) This is a seminal outcome, confirming that the momentum can be used to preferentially separate the heavier isotopes by embedding them into amorphous solid water.

These results confirm that isotopes entrained in a supersonic seeded beam can be enriched using preferential embedding in an amorphous ice capture matrix.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for enriching, separating, or enriching and separating chemical species having different masses, the method comprising:
   directing a first beam onto a surface, the first beam comprising a matrix material that forms a solid matrix on the surface;
   directing a second beam onto the surface, such that the second beam converges with the first beam at the surface, wherein the second beam is a supersonic beam comprising a first chemical species and a second chemical species, the first chemical species having a higher incident momentum than the second chemical species, whereby the first chemical species is preferentially embedded in the solid matrix, relative to the second chemical species; and
   releasing the first chemical species from the solid matrix and collecting the released first chemical species, collecting the second chemical species scattered from the solid matrix, or both.

2. The method of claim 1, wherein the solid matrix is an amorphous matrix.

3. The method of claim 1, wherein the matrix material comprises water molecules and the solid matrix is ice.

4. The method of claim 1, wherein the first beam is a supersonic beam.

5. The method of claim 1, wherein the first beam is an effusive beam.

6. The method of claim 1, wherein: (i) the first chemical species is a first isotope of a first element and the second chemical species is a second isotope of the first element; or (ii) the first chemical species is a first isotopologue of a first molecule and the second chemical species is a second isotopologue of the first molecule.

7. The method of claim 6, wherein the first chemical species is the first isotope of the first element and the second chemical species is the second isotope of the first element.

8. The method of claim 6, wherein the first chemical species is the first isotopologue of the first molecule and the second chemical species is the second isotopologue of the first molecule.

9. The method of claim 6, wherein the solid matrix is an amorphous matrix.

10. The method of claim 6, wherein the matrix material comprises water molecules and the solid matrix is ice.

11. The method of claim 10, wherein the ice is amorphous.

12. The method of claim 9, wherein releasing and collecting the isotopes of the first element or the isotopologues of the first molecule comprise heating the amorphous matrix to, or above, a temperature at which the amorphous matrix undergoes an amorphous-to-crystalline phase transition.

13. The method of claim 6, further comprising condensing the collected isotopes or isotopologues.

14. The method of claim 6, wherein the first beam is a supersonic beam.

15. The method of claim 6, wherein the first beam is an effusive beam.

16. The method of claim 7, wherein the first and second isotopes are selected from one of the following groups: $^{36}$Ar and $^{40}$Ar; $^{6}$Li and $^{7}$Li; $^{22}$Ne and $^{20}$Ne; $^{24}$Mg and $^{26}$Mg; $^{124}$Xe, $^{129}$Xe, $^{131}$Xe, $^{132}$Xe, $^{134}$Xe, and $^{136}$Xe; and $^{78}$Kr, $^{82}$Kr, and $^{86}$Kr.

17. The method of claim 8, wherein the first and second isotopologues are selected from one of the following groups: $^{12}$CH$_4$ and $^{13}$CH$_4$; $^{28}$SiH$_4$ and $^{29}$SiH$_4$; $^{28}$SiF$_4$ and $^{29}$SiF$_4$; H$_2$, HD, HT, D$_2$, DT, and T$_2$; $^1$H$_2$$^{16}$O, $^1$H$^2$H$^{16}$O, $^2$H$_2$$^{16}$O, $^1$H$_2$$^{16}$O, and $^1$H$_2$$^{18}$O, $^{16}$O$_2$ and $^{18}$O$_2$; $^{14}$N$_2$ and $^{15}$N$_2$; HBr and DBr; HCl and DCl; HI and DI; H$_2$S and D$_2$S; CH$_3$F, CD$_3$F, $^{13}$CH$_3$F, and $^{13}$CD$_3$F; CH$_3$Cl, CD$_3$Cl, $^{13}$CH$_3$Cl, and $^{13}$CD$_3$Cl; $^{13}$C$^{16}$O$_2$, $^{12}$C$^{16}$O$_2$, $^{13}$C$^{18}$O$_2$, and $^{12}$C$^{18}$O$_2$; $^{12}$C$^{18}$O, $^{13}$C$^{18}$O, $^{13}$C$^{16}$O, and $^{13}$C$^{18}$O; NH$_3$, $^{15}$NH$_3$, ND$_3$, and $^{15}$ND$_3$; NO and $^{15}$NO; $^{14}$N$_2$O, $^{15}$N$^{14}$NO, and $^{15}$N$_2$O; PH$_3$ and PD$_3$; COS and $^{13}$COS; CHCl$_2$F and CDCl$_2$F; $^{12}$CH$_2$F$_2$, $^{13}$CH$_2$F$_2$, $^{12}$CD$_2$F$_2$, and $^{13}$CD$_2$F$_2$; CH$_3$Br, $^{13}$CH$_3$Br, and CD$_3$Br; $^{12}$CH$_3$N, $^{13}$CH$_3$N, $^{13}$CH$_3$$^{15}$N, $^{12}$CH$_3$$^{15}$N, $^{12}$CD$_3$N, and $^{12}$CH$_2$DN; $^{12}$C$_2$H$_4$, $^{12}$C$_2$H$_2$D$_2$, $^{13}$C$_2$H$_4$, $^{13}$C$_2$D$_4$, and $^{12}$C$_2$H$_3$D; $^{12}$C$_2$H$_6$, $^{13}$C$_2$H$_6$, and $^{12}$C$_2$D$_6$; $^{32}$SF$_4$, $^{33}$SF$_4$, $^{34}$SF$_4$, and $^{36}$SF$_4$; and $^{12}$C$_3$H$_6$, $^{12}$C$_3$D$_6$, $^{13}$C$_3$H$_6$, and $^{12}$C$_3$H$_4$D$_2$.

* * * * *